US005973490A

United States Patent [19]

Nauta

[11] Patent Number: 5,973,490

[45] Date of Patent: Oct. 26, 1999

[54] LINE DRIVER WITH ADAPTIVE OUTPUT IMPEDANCE

[75] Inventor: Bram Nauta, Eindhoven, Netherlands

[73] Assignee: U.S. Philips Corporation, New York, N.Y.

[21] Appl. No.: 09/027,598

[22] Filed: Feb. 23, 1998

[30] Foreign Application Priority Data

Feb. 25, 1997 [EP] European Pat. Off. .............. 97200526

[51] Int. Cl.[6] .................................................... H04L 25/02

[52] U.S. Cl. .............................................................. 323/316

[58] Field of Search ...................................... 323/315, 316

[56] References Cited

U.S. PATENT DOCUMENTS 4,853,609 8/1989 Numata et al. ......................... 323/315
5,021,730 6/1991 Smith ...................................... 323/316
5,266,887 11/1993 Smith ...................................... 323/316
5,510,751 4/1996 Nauta ........................................ 330/84
5,519,309 5/1996 Smith ...................................... 323/316
5,585,763 12/1996 Navabi et al. .......................... 330/255
5,694,033 12/1997 Wei et al. ............................... 323/315

FOREIGN PATENT DOCUMENTS

WO9502931 1/1995 WIPO .............................. H04B 3/02

*Primary Examiner*—Jeffrey Sterrett
*Attorney, Agent, or Firm*—Steven R. Biren

[57] ABSTRACT

A line driver comprising a first transistor (M1), a first amplifier (A1) and a reference resistor (10) for converting an input voltage (Vin) to a first current (i1) through the first transistor (M1). A second current i2=n*i1 flows through a second transistor (M2) which forms a 1:n current mirror with the first transistor (M1). The current i2 flows to a load (6), if so required via a transmission line (TL). The impedance of the load (6) is equal to the characteristic impedance RL of the transmission line (TL). Thus the impedance seen by the line driver is equal to RL. A second transconductance amplifier (A2) counteracts reflected signals in the output signal (Vout) caused by mismatch between the output impedance of the current mirror (M1, M2) and the impedance seen by the line driver.

10 Claims, 5 Drawing Sheets

LINE DRIVER WITH ADAPTIVE OUTPUT IMPEDANCE

BACKGROUND OF THE INVENTION

The invention relates to a line driver, more particularly to a line driver with adaptive output impedance. Such a line driver is known from International Patent Application published under No. WO 95/02931. A line driver is an electronic buffer amplifier designed to have an output impedance matched to the characteristic impedance of a transmission line. Transmission lines are widely used for conveying electric signals. To minimise reflections the source and load impedances of the transmission line should be equal to the characteristic impedance of the transmission line. A standard value for video applications is 75 ohms. A buffer amplifier designed to drive a 75 ohm transmission line should have an output impedance of 75 ohms in order to minimize reflections. The buffer sees a load resistance of 75 ohms, i.e. the impedance of the terminated transmission line.

FIG. 1 shows a first known approach to implement such a buffer. The buffer provides a low-impedance voltage source VS with a series resistor Rs having a value equal to the characteristic impedance of the transmission line TL in order to implement the correct output impedance of the line driver. This type of line driver is often used in digital-to-analog converters (DAC) where the output voltage is controlled by a digital input signal. An disadvantage of this first known structure is that the voltage source VS has to deliver twice the desired output voltage. This becomes a problem where the available supply voltage drops while the signal levels remain unchanged; e.g. a 1.5Vpp output voltage at 3V supply voltage is barely possible.

FIG. 2 shows a second known approach. The voltage source with series resistance is replaced by a current source CS with a parallel resistance Rs. In this structure no voltage is lost, but half of the current delivered by the current source CS is wasted in the parallel resistance Rs. This technique is often used in DACs where the output current is digitally controlled.

It appears that both known solutions are not attractive since either voltage or current is wasted. Therefore it can be appreciated that a line driver with specified output impedance which matches the impedance of a transmission line and which does not require twice the output voltage or twice the output current is desirable.

SUMMARY OF THE INVENTION

It is therefore an object of this invention to provide a line driver with specified output impedance without the voltage loss inherent in the series resistor approach or without the current loss inherent in the parallel resistor approach. According to the invention there is provided a line driver comprising:

a line driver input terminal for receiving an input signal, a line driver output terminal for connecting a load, a current mirror having a current gain n, comprising:

a first transistor having a main current path inserted between a voltage supply terminal and a reference node, and a second transistor having a main current path inserted between the voltage supply terminal and the line driver output terminal, respective control electrodes of the first transistor and second transistor being connected to receive substantially the same control voltage, a reference resistor coupled to the reference node and having a resistance substantially equal to n times the characteristic resistance of the load, a first amplifier having differential input terminals coupled to the line driver input terminal and to the reference node, and having an output terminal coupled to the respective control electrodes of the first transistor and the second transistor, and a second transconductance amplifier having differential input terminals, one of the differential input terminals being responsive to a signal which is substantially equal to the input signal at the line driver input terminal and the other of the differential input terminals being coupled to the liner driver output terminal, having an output terminal coupled to the reference node and having a transconductance substantially equal to the reciprocal of the resistance of the reference resistor.

Due to the gain of the first amplifier the voltage at the reference node is substantially equal to the input voltage. The input signal is converted to a current through the reference resistor. An n times amplified current flows through the load. Since the resistance of the reference resistor is n times the resistance of the load the voltage across the load is equal to the input voltage. No signal voltage is wasted. The supply voltage can be low and should allow only for a proper voltage drop over the second transistor. Moreover, hardly any signal current is wasted, except for a relatively small current which flows through the first transistor and the reference resistor. By making the current gain n of the current mirror sufficiently high, for example n=10 to n=40 the current waste is negligible.

The second transconductance amplifier senses any unwanted reflected voltages at the line driver output terminal and converts these reflected voltages to an output current which flows from the output terminal of the second transconductance amplifier into the first transistor. The output current of the second transconductance amplifier is copied and multiplied in the current mirror. Reflections at the line driver output terminal are thus counteracted and the line driver behaves like a source with an output impedance equal to the load impedance.

The second transconductance amplifier senses the unwanted reflected voltages by comparing the output voltage at the line driver output terminal and the input voltage at the line driver input terminal. For this purpose, in an embodiment of the line driver according to the invention, said one of the differential input terminals of the second transconductance amplifier is coupled to the line driver input terminal.

For the same purpose, in an other embodiment of the line driver according to the invention, said one of the differential input terminals of the second transconductance amplifier is coupled to the reference terminal. Due to the gain of the first amplifier the voltage at the reference node is substantially equal to the input voltage. Sensing the voltage across the reference resistor therefore has substantially the same effect as sensing the input voltage.

The linearity of the line driver may be increased in an embodiment which further comprises a first bias current source coupled to the reference node, for supplying a first bias current, and a second bias current source coupled to the line driver output terminal, for supplying a second bias current having a value which is substantially equal to n times the value of the first bias current.

The accuracy of the resistance of the reference resistor may be insufficient in certain integrating processes. If this lack of accuracy is a problem the line driver may further comprise means for adjusting the resistance of the reference resistor in response to a low-frequency voltage difference between the line driver output terminal and a selected one of the line driver input terminal and the reference node, or alternatively it may comprise means for adjusting the current gain n of the current mirror in response to a low frequency voltage difference between the line driver output terminal and a selected one of the line driver input terminal and the reference node or means for adjusting the transconductance of the second transconductance amplifier in response to a low-frequency voltage difference between the line driver output terminal and a selected one of the line driver input terminal and the reference node.

BRIEF DESCRIPTION OF THE DRAWING

These and other aspects of the invention will be described in more detail, by way of example, with reference to the accompanying drawings, in which.

DESCRIPTION OF THE PREFERRED EMBODIMENTS

In the Figures corresponding elements have the same reference signs.

Figure 1:
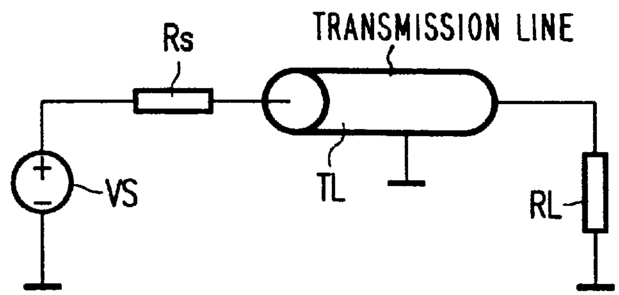
FIG. 1 shows a circuit diagram of a conventional line driver with voltage source and series resistor.
Figure 2:
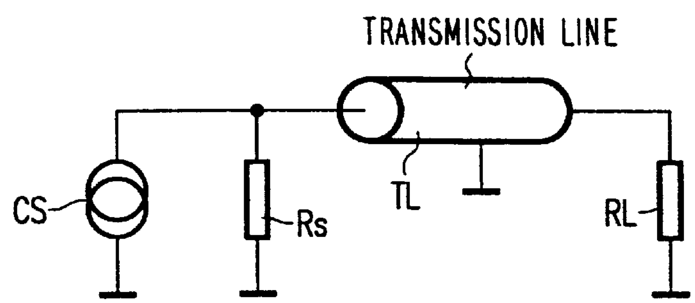
FIG. 2 shows a circuit diagram of a conventional line driver with current source and parallel resistor.
Figure 3:
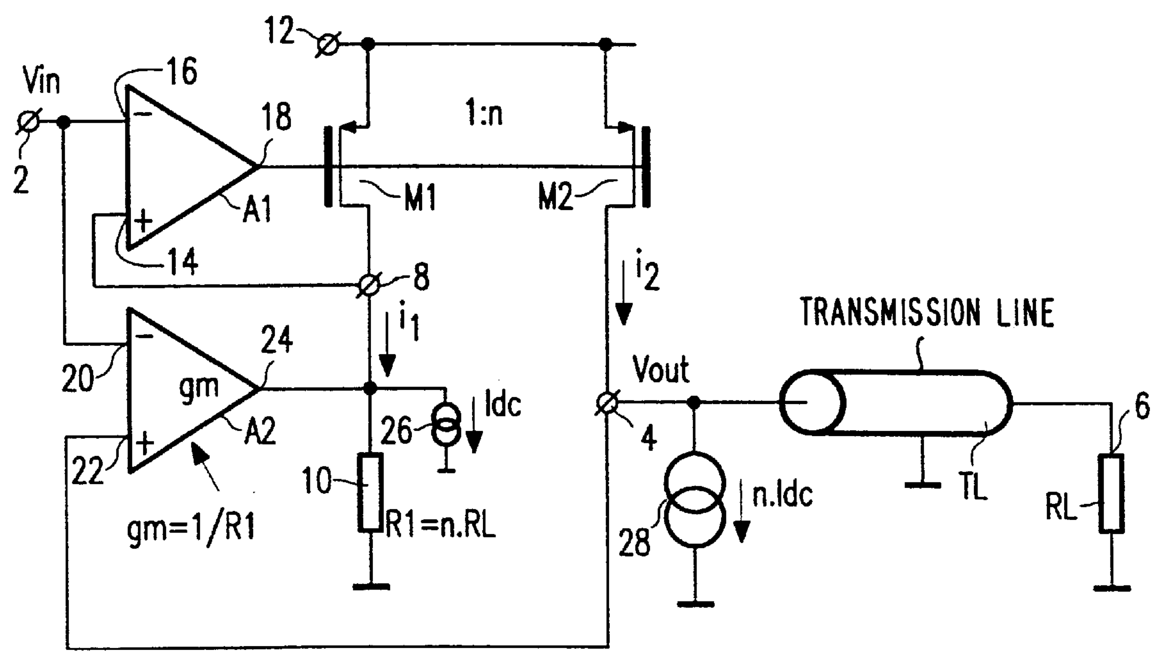
FIG. 3 shows a circuit diagram of a first embodiment of a line driver according to the invention.

FIG. 3 shows the circuit diagram of an embodiment of a line driver according to the invention. The line driver has a line driver input terminal 2, which receives an input signal Vin. The input signal Vin may be a video signal, an audio signal, a telephone signal, a digital data signal etc., provided with an appropriate DC bias. The line driver further has a line driver output terminal 4 for connecting a load 6 via a transmission line TL. The transmission line, however, is optional and can be omitted if so desired. The resistance RL of the load 6 is equal to the characteristic impedance of the transmission line TL, for example 75 ohms. As is known from the art of transmission lines, the impedance seen at the line driver output terminal 4 is equal to the characteristic impedance RL of the transmission line TL. The line driver further comprises a reference node 8 to which a reference resistor 10 is connected. The reference resistor 10 has a resistance R1 which is n times the resistance RL of the load 6, i.e. R1=n*RL, n being a positive number.

The main current path of a first PMOS transistor M1 is inserted between the reference node 8 and a positive supply terminal 12, and the main current path of a second PMOS transistor M2 is inserted between the line driver output terminal 4 and the positive supply terminal 12. The control electrodes or gates of the transistors M1 and M2 are interconnected and receive the same control voltage. The transistors M1 and M2 thus form a current mirror or current amplifier, i.e. there is a fixed ratio (current gain) between the current through the first transistor M1 and the current through the second transistor M2. By a suitable design, for example by proportioning the geometries of the first and second transistors M1 and M2 in the ratio 1:n, the current ratio can be fixed at the same factor n as mentioned before in relation to the resistances of the reference resistor 10 and the load 6. A typical value for the current gain n is in the range from 10 to 40.

A first amplifier, which may be a normal operational amplifier or an operational transconductance amplifier (OTA) A1, has its non-inverting input terminal 14 coupled to the reference node 8, and has its inverting input terminal 16 coupled to the line driver input terminal 2. The output terminal 18 of the first OTA A1 drives the interconnected control electrodes of the transistors M1 and M2. Assuming that there is sufficient gain in the system of amplifier A1 and transistor M1, the signal voltage at the reference node 8 is substantially equal to the input voltage Vin at the line driver input terminal 2. The input voltage Vin thus causes a current i1=Vin/R1 to flow through the reference resistor 10. Since R1=n*RL this current is also equal to i1=Vin/(n*RL). Due to the current amplification n the current i2 through transistor M2 is n times the current through transistor M1: i2=n*i1=Vin/RL. This means that the output voltage Vout at the line driver output terminal 4 is also equal to Vin. No signal voltage is wasted between the input voltage Vin at the line driver input terminal 2 and the output voltage Vout at the line driver output terminal 4. The positive supply voltage at the positive supply terminal 12 should be high enough to allow a proper voltage drop across the transistors M1 and M2. A supply voltage as low as 3V is sufficient to drive 1.5Vpp in a 75 Ohm load.

The output impedance of the second transistor M2 is high and would not match with the characteristic impedance RL of the terminated transmission line TL. A second transconductance amplifier A2 is added to emulate the correct output impedance RL at the line driver output terminal 4. The second transconductance amplifier A2 preferably has a transconductance gm which is equal to the reciprocal of the resistance R1 of the reference resistor 10, i.e. gm=1/R1. The second transconductance amplifier A2 has its inverting input terminal 20 coupled to the line driver input terminal 2 and its non-inverting input terminal 22 to the line driver output terminal 4. The output terminal 24 of the second transconductance amplifier A2 is coupled to the reference terminal 8. The second transconductance amplifier A2 has a transconductance gm, which means that the current supplied at output terminal 24 is equal to gm times the voltage difference between the non-inverting input terminal 2 and the inverting input terminal 20.

If no reflections occur at the line driver output terminal 4, i.e. when Vout=Vin, the differential input voltage for the second transconductance amplifier A2 is zero and the second transconductance amplifier A2 has no further effect. In the case of reflections, however, the second transconductance amplifier A2 comes into action. Assuming that the reflected voltage is equal to dVout, the output voltage is now Vout+dVout and the second transconductance amplifier A2 sees a differential voltage dVout at its input terminals 20 and 22. In response to this voltage difference the second transconductance amplifier A2 generates an output current gm*dVout. This output current flows into transistor M1 and is copied and multiplied with a factor n in transistor M2. The result is that the output current i2 decreases by a factor dVout*gm*n, which decrease must be equal to the increase dVout*RL in the output current i2. If the transconductance gm fulfills the following condition: gm=1/(n*RL)=1/(R1), the line driver has an output impedance equal to the characteristic impedance RL.

Figure 4:
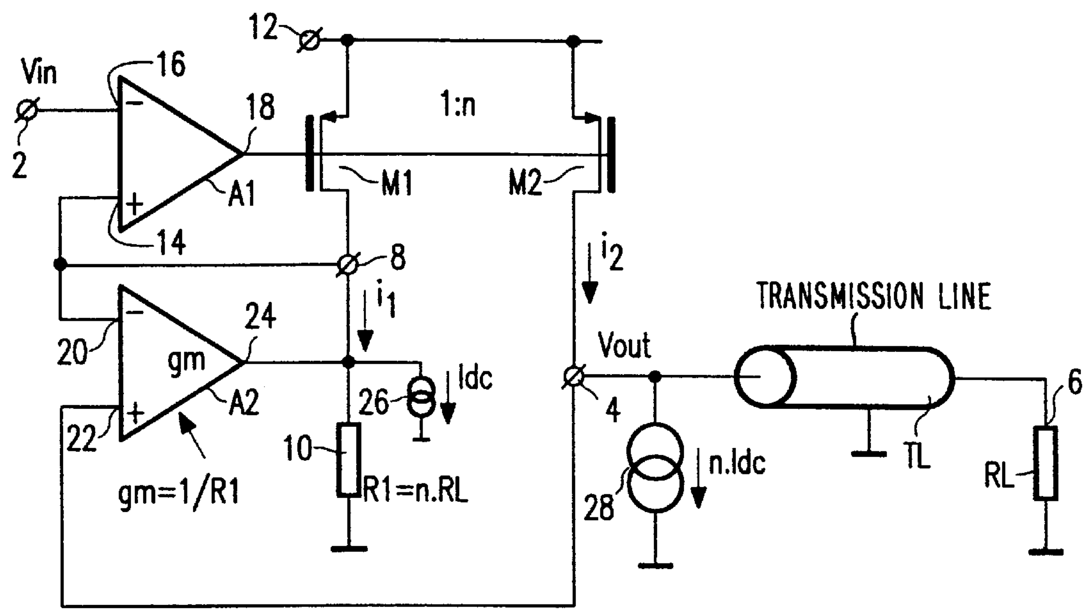
FIG. 4 shows a circuit diagram of a second embodiment of a line driver according to the invention.

FIG. 4 shows a modification to the circuit diagram of FIG. 3. In FIG. 4 the input terminal 20 of the second transconductance amplifier A2 is connected to the reference terminal 8 instead of to the line driver input terminal 2. Due to the high gain of amplifier A1 the voltage difference between the input terminals 14 and 16 of amplifier A1 is small and negligible. Therefore the signal at the reference terminal 8 is substantially equal to the input voltage Vin at the line driver input terminal 2. Connecting the input terminal 20 of the second transconductance amplifier A2 to the reference terminal 8 thus has substantially the same effect as a connection to the input terminal 2. This modification can also be applied to the embodiments to be discussed below in relation to FIGS. 5 and 6.

Turning back to FIG. 3, FIG. 3 further shows an optional first bias current source 26 connected to the reference node 8 which provides a bias current Idc through the first transistor M1. Similarly, a second bias current source 28 is connected to the line driver output terminal 4 and provides a bias current n*Idc through the second transistor M2. The addition of the two bias current sources 26 and 28 enhances the linearity of the line driver, while slightly more power is consumed.

Figure 5A:
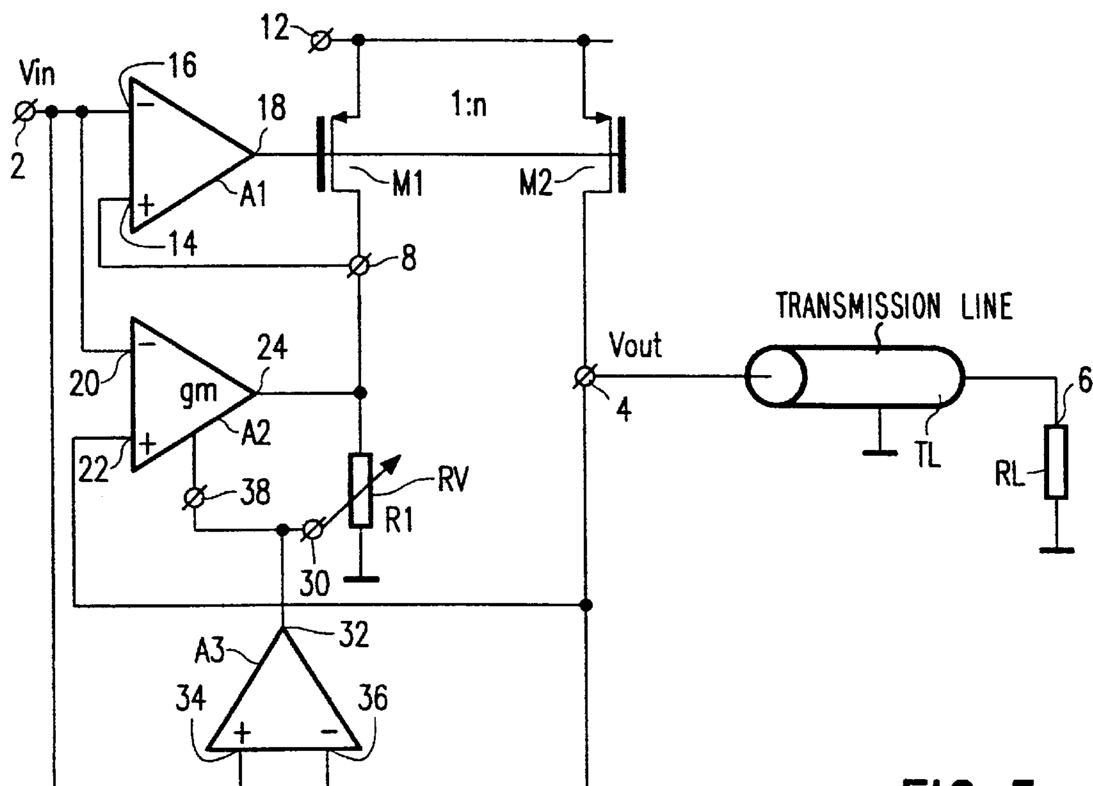
FIGS. 5*a* and 5*b* show a circuit diagram of a third embodiment of a line driver according to the invention.
Figure 5B:
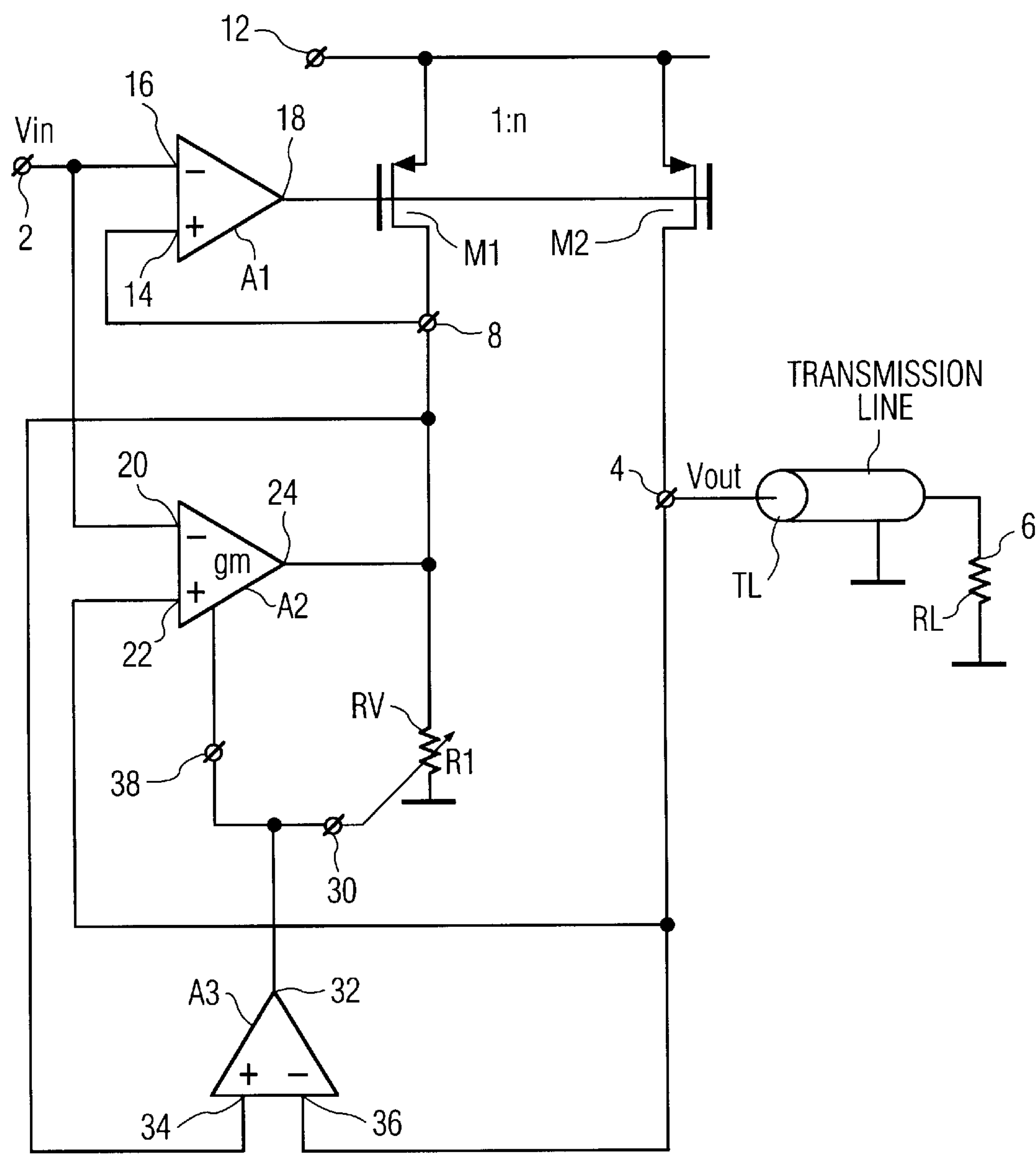

FIGS. 5*a* and 5*b* show an embodiment in which the reference resistor is an electronically variable resistor RV with a resistance control terminal 30 for varying the resistance of the reference resistor 10. The resistance control terminal 30 is driven by an output 32 of a differential amplifier A3, which has one of its inputs, for example a non-inverting input 34, connected to receive the input voltage Vin as shown in FIG. 5*a* and has the other input, for example an inverting input 36, connected to receive the output voltage Vout. The amplifier A3 preferably has a small bandwidth and tunes the DC resistance R1 of the variable resistor RV to the desired value n*RL. The tuning may be useful where the accuracy of the reference resistor 10 is a problem due to process variations or where a load with different resistance is connected. The non-inverting input 34 of amplifier A3 may alternatively be connected to receive the voltage at the reference node 8 instead of at the line driver input terminal 2, as in FIG. 5*b*.

In addition to tuning of the reference resistor 10, the value of the transconductance gm of the second transconductance amplifier A2 may be made tunable in order to correct for inaccuracies in the normal value of the transconductance gm. For this purpose, the second transconductance amplifier A2 has a variable transconductance which can be controlled with a suitable control signal at a control terminal 38 of the second transconductance amplifier A2. The output 32 of amplifier A3 provides the control signal to the control terminal 38 and tunes the transconductance gm to the desired value 1/(R1).

Figure 6A:
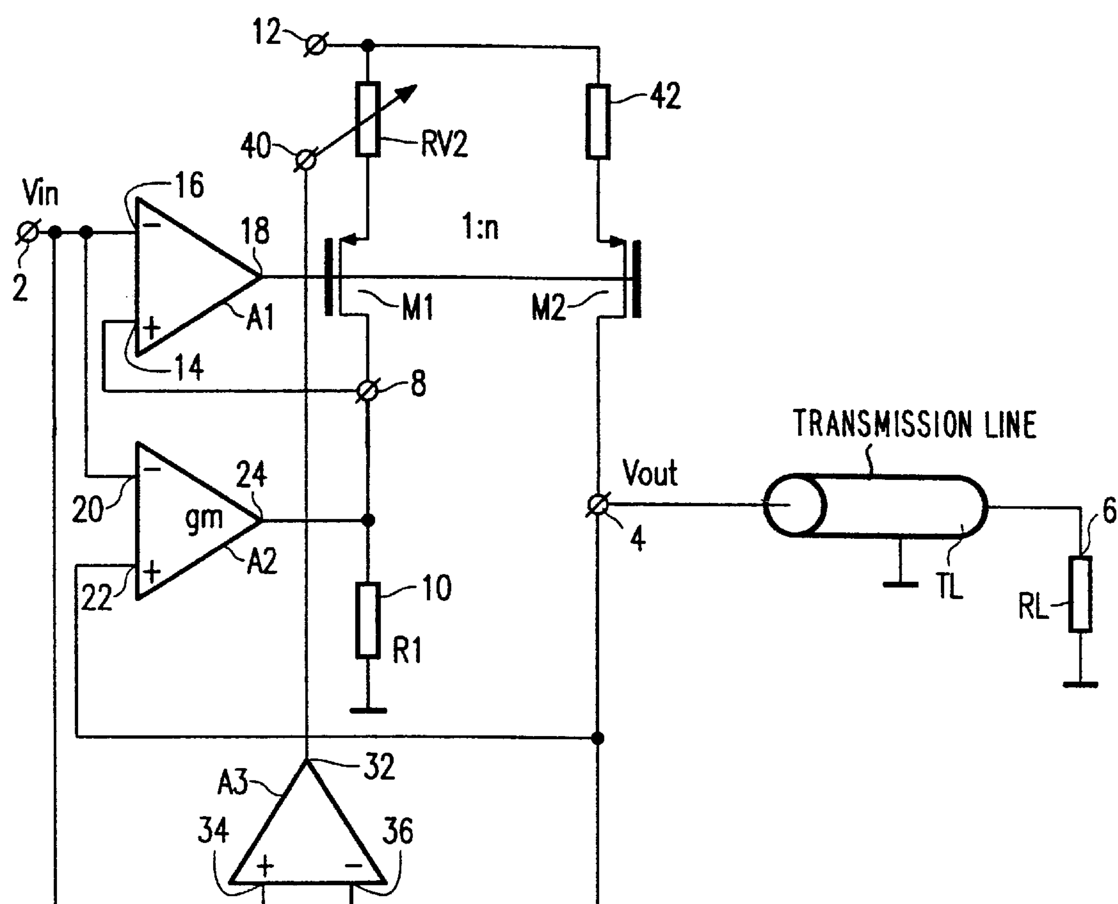
FIGS. 6*a* and 6*b* show a circuit diagram of a fourth embodiment of a line driver according to the invention.
Figure 6B:
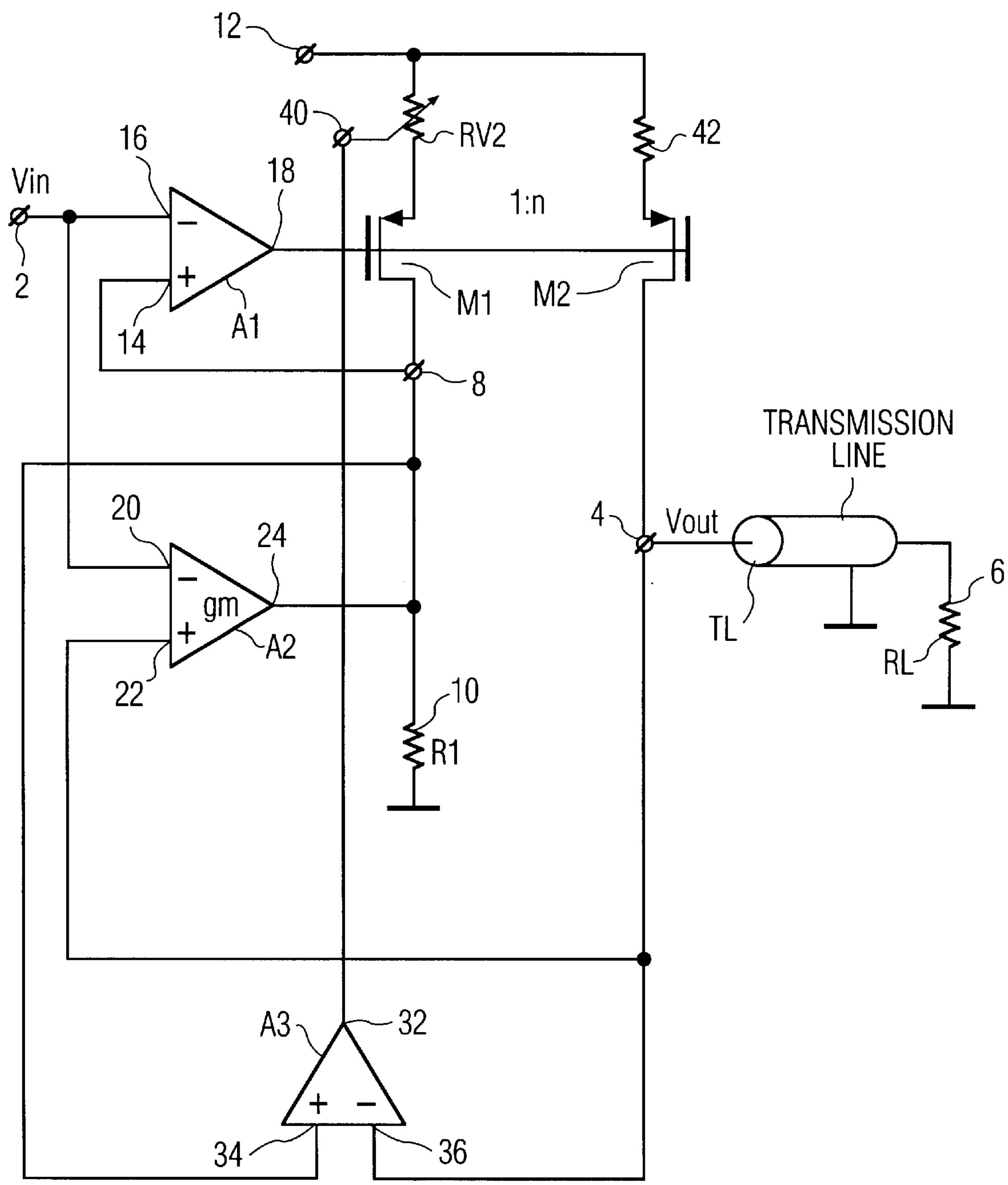

Instead of, or in addition to, tuning of the resistance of the reference resistor 10 and/or tuning of the transconductance of the second transconductance amplifier A2 the current gain n can be tuned by making the current gain of the current mirror M1/M2 variable. FIGS. 6*a* and 6*b* illustrate a possible solution for making a variable current gain n. A variable resistor RV2 is connected in series with the source of transistor M1. The control terminal 40 of the variable resistor RV2 is connected to the output 32 of the differential amplifier A3. The input terminals 34 and 36 of the differential amplifier A3 are connected as shown in FIGS. 5*a* and 5*b*. A further resistor 42 may be connected in series with the source of transistor M2 for reasons of symmetry.

The invention is not limited to the embodiments shown in the Figures. Instead of unipolar MOS transistors bipolar transistors may be employed, in which case the base, emitter and collector of a bipolar transistor replace the gate, source and drain of a unipolar transistor.

The current mirror configuration can be a more sophisticated or elaborated one. Cascode transistors may be inserted in series with the drains of the transistors M1 and M2 etc. In principle, any current mirror configuration with a current gain n can be used for this purpose, but it will be appreciated that complex current mirror configurations generally need more supply voltage to operate properly.

More generally, a line driver is disclosed comprising a first transistor M1, a first amplifier A1, and a reference resistor 10 for converting an input voltage Vin to a first current i1 through the first transistor M1. A second current i2=n*i1 flows through a second transistor M2 which forms a 1:n current mirror with the first transistor M1. The current i2 flows to a load 6 via a transmission line TL. The transmission line TL, however, is optional. The impedance of the load 6 is equal to the characteristic impedance RL of the transmission line TL. Thus the impedance seen by the line driver is equal to RL. A second transconductance amplifier A2 counteracts reflected signals dV in the output signal Vout caused by mismatch between the output impedance of the current mirror M1, M2 and the impedance seen by the line driver.

What is claimed is:

1. A line driver comprising:

a line driver input terminal (2) for receiving an input signal, a line driver output terminal (4) for connecting a load (TL, 6), a current mirror (M1, M2) having a current gain n, comprising:

a first transistor (M1) having a main current path inserted between a voltage supply terminal (12) and a reference node (8), and a second transistor (M2) having a main current path inserted between the voltage supply terminal (12) and the line driver output terminal (4), respective control electrodes of the first transistor (M1) and second transistor (M2) being connected to receive substantially the same control voltage, a reference resistor (10) coupled to the reference node (8) and having a resistance substantially equal to n times the characteristic resistance of the load (TL, 6), a first amplifier (A1) having differential input terminals (14, 16) coupled to the line driver input terminal (2) and to the reference node (8), and having an output terminal (18) coupled to the respective control electrodes of the first transistor (M1) and the second transistor (M2), and a second amplifier (A2) having differential input terminals (20, 22), one (20) of the differential input terminals being responsive to a signal which is substantially equal to the input signal at the line driver input terminal (2) and the other (22) of the differential input terminals being coupled to the liner driver output terminal (4), having an output terminal (24) coupled to the reference node (8) and having a transconductance substantially equal to the reciprocal value of the resistance of the reference resistor (10).

2. A line driver as claimed in claim 1, wherein said one (20) of the differential input terminals of the second amplifier (A2) is coupled to the line driver input terminal (2).

3. A line driver as claimed in claim 1, wherein said one (20) of the differential input terminals of the second amplifier (A2) is coupled to the reference terminal (8).

4. A line driver as claimed in claim 1, further comprising a first bias current source (26) coupled to the reference node (8), for supplying a first bias current, and a second bias current source (28) coupled to the line driver output terminal (4), for supplying a second bias current having a value which is substantially equal to n times the value of the first bias current.

5. A line driver as claimed in claim 1, further comprising means (A3, 30, RV) for adjusting the resistance of the reference resistor (10) in response to a low-frequency voltage difference between the line driver output terminal (4) and a selected one of the line driver input terminal (2) and the reference node (8).

6. A line driver as claimed in claim 5, wherein the means for adjusting comprises a variable resistor (RV) coupled to the reference node (8) and a differential amplifier (A3) having differential input terminals (34, 36) coupled to the line driver output terminal (4) and a selected one of the line driver input terminal (2) and the reference node (8), and having an output (32) coupled to a resistance control terminal (30) of the variable resistor (RV).

7. A line driver as claimed in claim 1, further comprising means (A3, RV2, 40) for adjusting the current gain n of the current mirror in response to a low-frequency voltage difference between the line driver output terminal (4) and a selected one of the line driver input terminal (2) and the reference node (8).

8. A line driver as claimed in claim 7, wherein the means for adjusting the current gain n comprises a variable resistor (RV2) inserted between the voltage supply terminal (12) and a selected one of the first transistor (M1) and the second transistor (M2), and a differential amplifier (A3) having differential input terminals (34, 36) coupled to the line driver output terminal (4) and a selected one of the line driver input terminal (2) and the reference node (8), and having an output (32) coupled to a resistance control terminal (40) of the variable resistor (RV2).

9. A line driver as claimed in claim 1, further comprising means (A3, A2, 38) for adjusting the transconductance of the second amplifier (A2) in response to a low-frequency voltage difference between the line driver output terminal (4) and a selected one of the line driver input terminal (2) and the reference node (8).

10. A line driver as claimed in claim 9, wherein the second amplifier (A2) has a variable transconductance and wherein the means for adjusting the transconductance comprises a differential amplifier (A3) having differential input terminals (34, 36) coupled the line driver output terminal (4) and a selected one of the line driver input terminal (2) and the reference node (8), and having an output (32) coupled to a transconductance control terminal (38) of the second amplifier (A2).

* * * * *